United States Patent
Scott et al.

[11] Patent Number: 5,482,503
[45] Date of Patent: Jan. 9, 1996

[54] APPARATUS FOR WASHING POULTRY CARCASSES

[75] Inventors: Richard Scott, Naples; David Bleth, Fort Meyers; Gerald Banks, Lehigh Acres; Todd Coppedge, Estero; William DeWitt, Cape Coral; Oliver Hahn, Fort Meyers; Maurice Hunking, Lehigh Acres; Wayne Mullineaux, Alva; Manfred Peters, Fort Meyers; Richard Smith, Lehigh Acres; Todd Walter, Fort Meyers, all of Fla.

[73] Assignee: Baader North America Corporation, Fort Meyers, Fla.

[21] Appl. No.: 374,943

[22] Filed: Jan. 18, 1995

[51] Int. Cl.⁶ .................................................. A22C 21/00
[52] U.S. Cl. ........................................ 452/173; 452/22
[58] Field of Search ............................. 452/173, 77, 74, 452/81, 87, 88, 89, 91, 92, 93

[56] References Cited

U.S. PATENT DOCUMENTS

| | | | |
|---|---|---|---|
| 644,400 | 2/1900 | Brooks | 452/173 |
| 1,617,002 | 2/1927 | Zerbe | 452/173 |
| 3,523,324 | 8/1970 | Debaere | 452/173 |
| 3,803,669 | 4/1974 | Dillon | 452/173 |
| 3,952,371 | 4/1976 | LaPine et al. | 452/173 |
| 4,446,601 | 5/1984 | Carruthers | 452/173 |
| 4,535,509 | 8/1985 | Bullock et al. | 452/173 |
| 4,567,619 | 2/1986 | Clark | 15/97 B |
| 4,653,135 | 3/1987 | Clark | 15/230.16 |
| 5,041,054 | 8/1991 | Van Den Neuwelaar et al. | 452/173 |

Primary Examiner—Willis Little
Attorney, Agent, or Firm—George J. Brandt, Jr.; Thomas R. Morrison

[57] ABSTRACT

Poultry carcasses are washed in apparatus which includes a frame in which a rotary carousel operates, the carcasses being transported through the apparatus on a shackle train which operates in tandem with the carousel. Associated with each shackle and carried on the carousel is a water lance that moves up and down inside the carcass as it transits the apparatus and sprays water on the carcass interior. Power means to move the lances up and down during washing transit of a carcass are provided as is means to control such power means operation. Scrubbing brushes are provided to scrub a carcass exterior as it exits the apparatus, and a final water rinse is applied to the carcass after its exit from the apparatus. The scrubbing brushes are specially fabricated and shaped from flat nylon strips.

19 Claims, 6 Drawing Sheets

APPARATUS FOR WASHING POULTRY CARCASSES

BACKGROUND OF THE INVENTION

The present invention relates to apparatus for washing poultry carcasses and, more particularly, to such apparatus that more effectively and thoroughly perform washing than apparatus as has been used heretofore.

It is known that poultry carcasses need be cleaned as by washing same during a processing operation to remove soil therefrom both exteriorly and interiorly on the carcass. Prior apparatus used for such purpose while satisfactory in some respects is undesirable in regard to unnecessary water usage, insufficient external carcass surface cleaning as well as internal carcass water spray cleaning action. Accordingly it, is desirable that a more efficient and less costly and safer to operate carcass washing apparatus be provided.

OBJECTS AND SUMMARY OF THE INVENTION

It is an object of the invention to provide apparatus which better cleans poultry carcasses than heretofore.

It is a further object of the invention to provide poultry washing apparatus that is specially suited to clean a carcass interior more completely.

It is a still further object of the invention to provide poultry washing apparatus which vigorously scrubs a carcass with scrubbing brushes thereby diminishing or eliminating downstream processing labor requirement.

Another object is to provide poultry carcass washing apparatus which is less wasteful of wash water than prior used apparatus.

In accordance with the invention, a rotary carousel rotatable about a fixed axis is supported on a frame, and a track passes through this frame on which track a train of chicken carcasses supported on shackles can transit in tandem travel with the carousel from an entry to an exit from the apparatus. The carcasses have an open cavity facing upwardly into which a water lance can descend and retract. The carousel has for each shackle an associated wash water actuator, power operated vertical stroking means, the water lance being connected to the stroking means. As the carcass moves through the apparatus, control means operate to stroke the water lance in a number of up and down cycles in which a cone shaped spray of wash water is directed against the carcass interior. Control of this is with cam controlled switches which allow power supply to the stroking means to operate same.

As long as the water actuator is actuated, water flows to the water lance. Power supply to the stroking means for downward stroking can be a pressurized fluid such as compressed air operating at one side of the cylinder unit. A lower pressure of air can be maintained at an opposite side of the cylinder unit so that on a release of pressure at said one side, a cylinder will stroke upwardly. A distribution manifold can be provided to distribute pressurized fluid to the cylinders and wash water to the lances, a feature being that vent means are structured into the manifold to vent leakage therein of any given media so it cannot enter the flow course of another medium.

Scrubbing brushes are provided at the exit location of a carcass from the apparatus to scrub the carcass exterior. These brushes are a pair of side by side arranged, hydraulic driven brushes with overlapping brush masses which define a scrubbing zone through which a carcass must pass. By reason of fabrication of the brushes from slitted strips of nylon which are formed into scrub packs, this relatively stiffened nylon brush mass effects quite vigorous scrubbing action on the carcass removing debris (blood, feathers, fecal material) and other unwanted processing matter therefrom.

Other features of the invention provide for rinsing of the scrubbing brushes, a final rinse of the carcass on exit from the apparatus and a detector to prevent final rinse action in respect of an empty shackle passage from the apparatus.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

The apparatus herein described is intended primarily for washing a chicken carcass at a location in the eviscerating line after the neck is broken and prior to chilling. It could however be employed for washing carcasses of other poultry types with equal advantage. For simplicity of description, the apparatus is referred to hereafter simply as the "bird washer".

Figure 1:
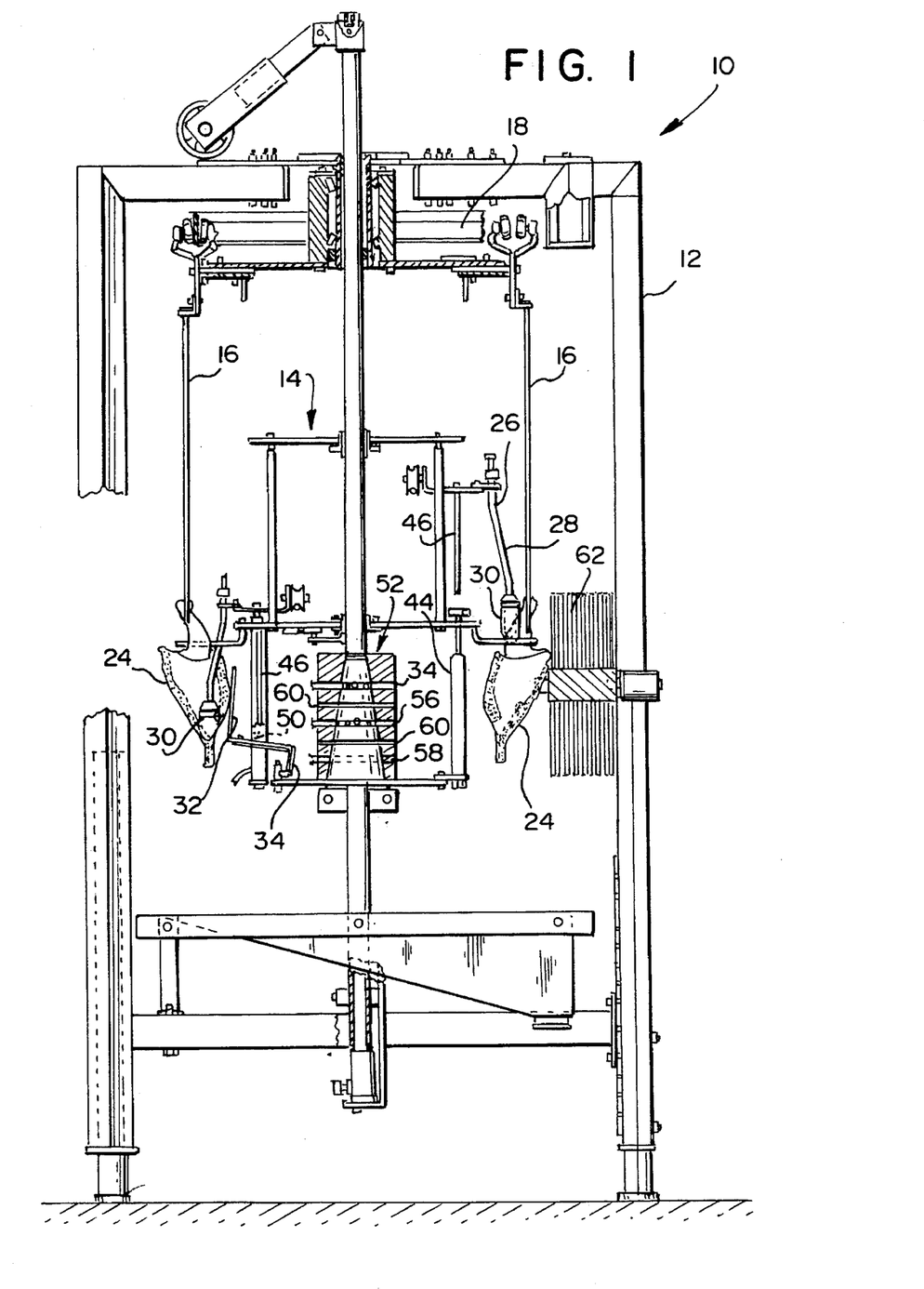
FIG. 1 is a side elevational view of the bird washer apparatus, some parts being shown in section and others broken for purpose of understanding, there being shown two bird carcasses in the process of wash pass through in the apparatus.
Figure 2:
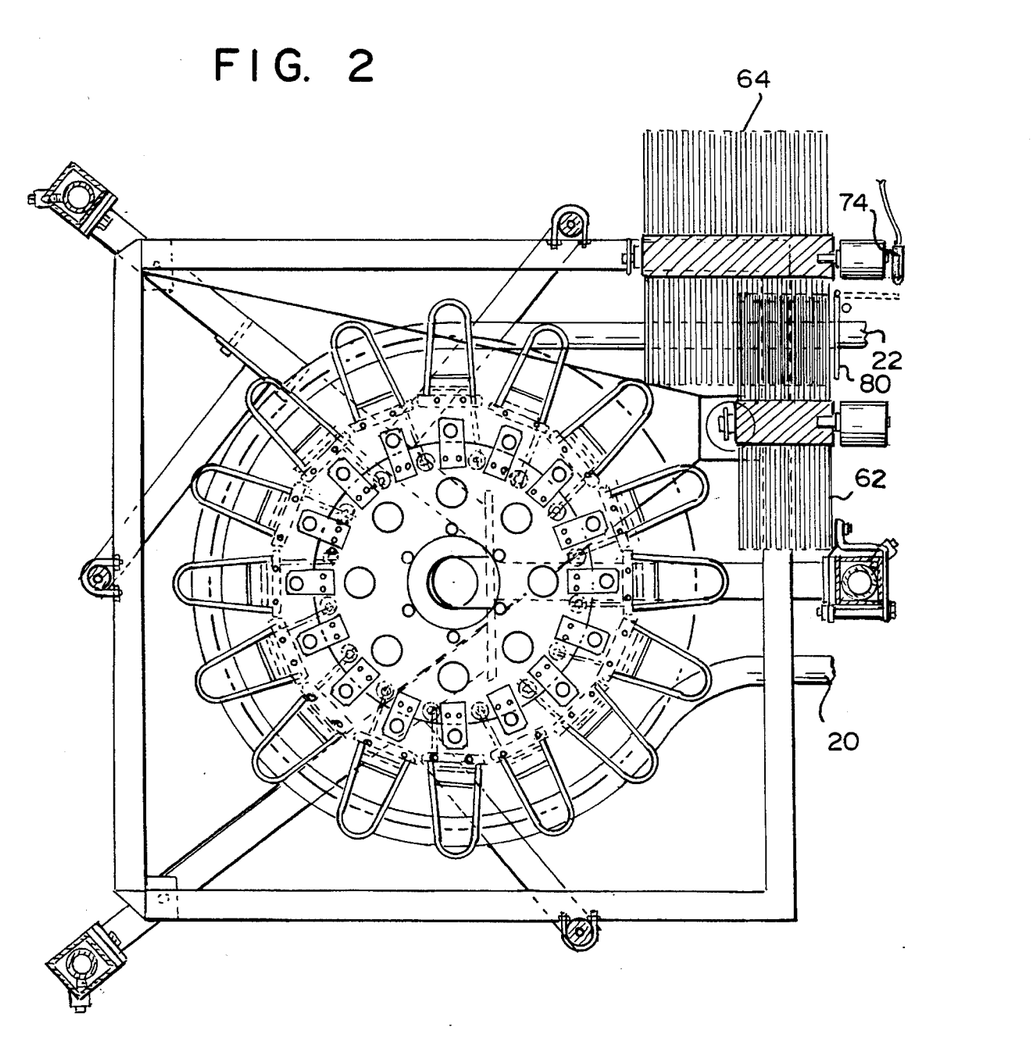
FIG. 2 is a top view of the apparatus shown in FIG. 1 and as viewed 90 degrees to the right relative to FIG. 1, the view showing the twin scrub brush set located at the exit location of the apparatus.

Referring to FIG. 1, the bird washer 10 includes a supporting frame structure 12 on which is supported a rotary carousel 14, rotary carousel usage in the chicken processing environment for many and diverse processing requirements being well known to those of ordinary skill in the art. The carousel 14 carries components as will be described and these are associated with the individual ones of shackles 16 on which bird carcasses are carried for processing, the shackles moving on a shackle chain that has tandem travel with the carousel, the shackles riding on a fixed track 18 which has an entry as at 20 as well as an exit location 22 from the bird washer (FIG. 2).

When a shackle 16 carrying a bird carcass 24 which bird is hung by its legs from the shackle with an open carcass belly cavity facing upwardly enters the bird washer, a water lance 26 is aligned therewith so that on descent of the lance it will enter into the cavity. Each water lance has a shank part 28 for connection to wash water flow, and a nozzle 30 at the tip end of the shank, this nozzle being a type that creates a hollow cone shaped discharge.

On entry of the bird carcass to the washer, a breast part thereof engages with an associated moving paddle 32, this paddle being such as to actuate a water valve 34 that allows water to flow to the water lance associated with the shackle. An advantage of this is that if the shackle holds no bird, the paddle does not actuate the valve and water wastage is avoided in respect of the shackle travel through the washer. If a bird be present on the shackle, washing will proceed.

The washing involves moving the lance up and down a number of times in cycles to allow a cone shaped spray pattern of water to impinge the carcass interior, this being a full interior carcass expanse impingement which reaches all interior cavity surfaces.

Figure 3:
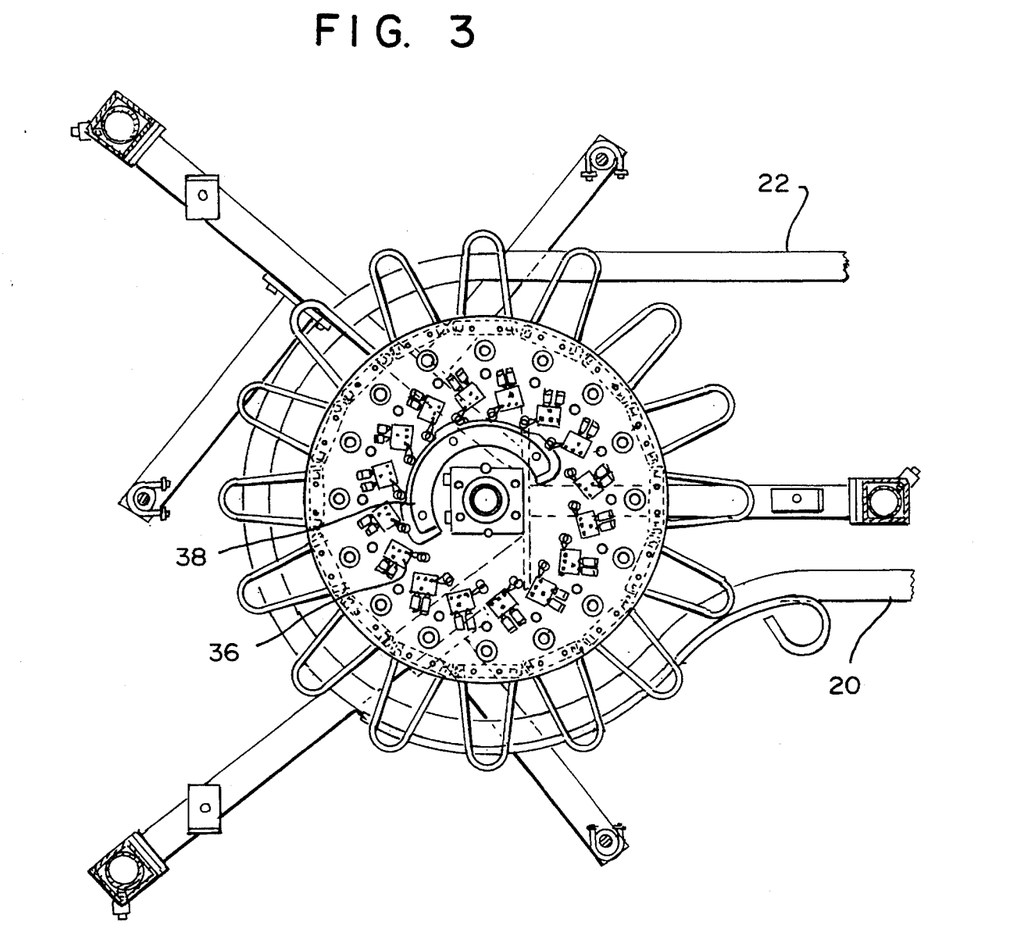
FIG. 3 is a view similar to FIG. 2 but with certain structure removed so as to illustrate the arraying of water lance control valves and a cam member associated with vertical stroking of the water lance.
Figure 4:
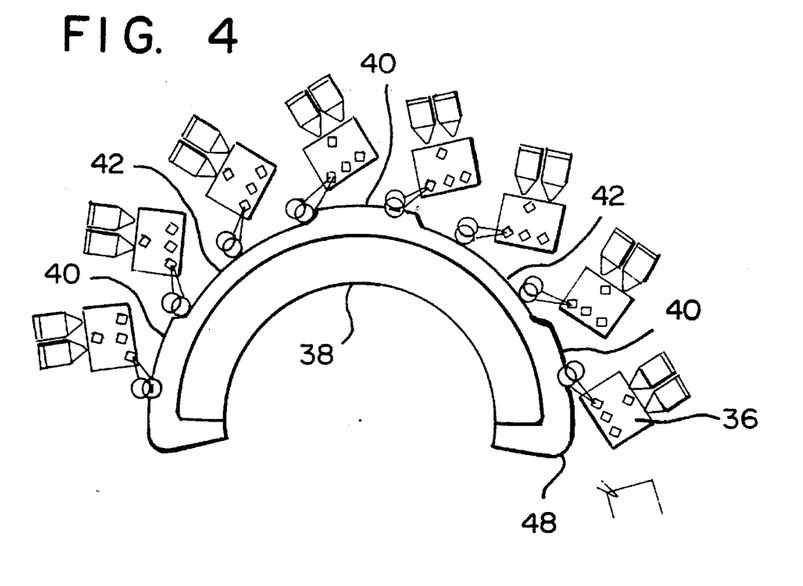
FIG. 4 is an enlarged scale plan view of the cam depicted in FIG. 3 and with fragment showing of only a few of the control valves actuated with the cam.

To power operate and control water lance up and down cycling, and as can be seen from reference to FIGS. 3 and 4 and additionally to FIG. 1, the carousel will during rotation effect actuation a number of times of three-way control valves 36 by using a fixed cam 38 with which valve actuating arm followers engage. The cam 38 has high points 40 and low points 42, the high points actuating the valves such as to cause high pressure fluid supply to one side, i.e., face of a piston 50 of a cylinder unit 44, to which the water lance is attached, this causing cylinder rod 46 to stroke down and carry the lance 26 downwardly. It should be noted that the stroke of the rod can be adjustably set for use with carcasses of different sizes.

Engagement of control valve 36 cam followers 48 with cam low points 42 results in stopping high pressure flow to the cylinder units. Since an opposite face of the cylinder unit piston always is in communication with a lower value pressurized fluid, the cylinder unit will be caused thereby to stroke up and carry the water lances upwardly. Maximum water lance up and down extremes for a set are seen in FIG. 1 although as just noted the stroke can be adjusted and set for bird size differences.

This arrangement has the advantage that if pressurized fluid supply failure occur in a system, a pressurized receiver also freely communicating with said cylinder piston opposite face will supply fluid to stroke the rod 46 upward moving the lance in like fashion, clearing the lance from the carcass and preventing possible damaging result if the lance in lowered condition was carried along with the carcass toward exit in which case the lance would be damaged.

Referring to FIG. 1, a manifold unit 52 centrally positioned in the carousel is used to supply higher and lower pressures of compressed air to the cylinder units, and wash water to the lance. The manifold includes three tiers of connection means or openings, one tier 54 being associated with higher pressure air, a next lower tier 56 with a lower air pressure, and the lowest 58 with wash water. The openings in the tiers are associated each with a given one of the cylinder units and its attached water lance to effect supply to such components as the carousel rotates. By arranging the manifold this way, it is possible to intervene the tiers with laterally directed grooves 60 in the manifold structure so that a leakage of medium from a tier within the manifold can vent sideways through a groove and out through holes to the manifold exterior thus preventing leakage to the tier openings of another medium.

Following completion of water lance up and down cycling, e.g., three such cycles which occurs in about 200 degrees of rotation of the carousel and which provides six complete washings of the carcass interior, the carcass 24 will have travelled to the exit 22 to the washer. With arrival of a carcass at the exit, the water actuator 32 no longer will contact the carcass so that washer water supply to the associated water lance 26 is terminated to conserve water, a practice not prevalent in prior bird washers.

Before bird exit from the washer is completed though, the carcass will be scrubbed on its exterior surface with scrubbing means as are described next.

Figure 5:
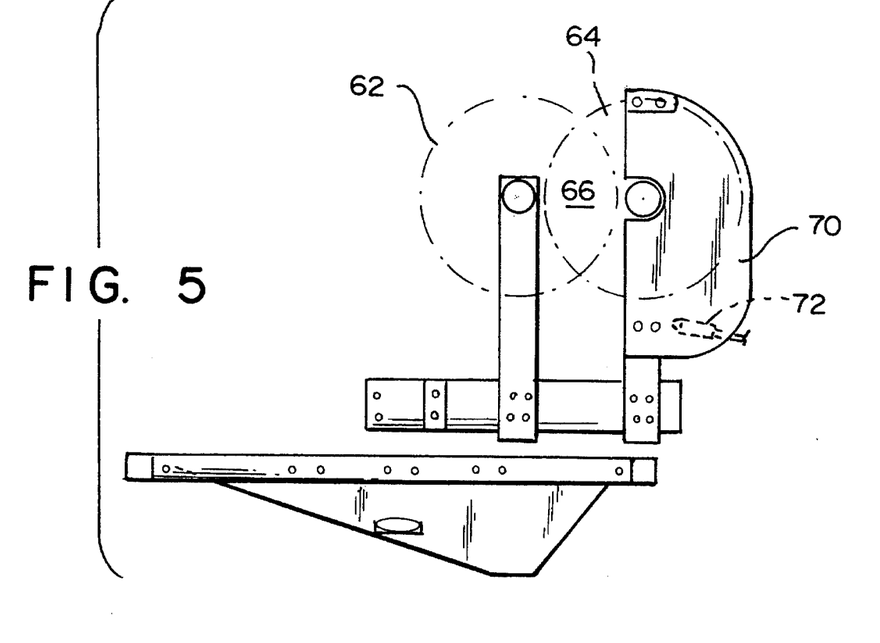
FIG. 5 is a fragmentary side elevational view looking at the exit of the apparatus and illustrating the exit zone of the bird as well as positioning of brush wash nozzle means operative within the housing for cleaning the brushes.

With reference to FIGS. 1 and 2 and FIG. 5 wherein such is depicted in long short dashed lines, the scrubbing means comprises a pair of side by side arranged brushes 62, 64. The brushes are hydraulic driven in counter rotating courses about spaced parallel axes, the axis spacing being such that the rotary travel course of one brush 62 intersects that of the other 64. This provides an overlapped or interfitting brush mass defining a zone 66 of elliptical configuration as seen best in FIG. 5 and through which zone, the bird must pass on exiting the bird washer. In bird passage through this zone 66, the carcass exterior is subjected to a very vigorous external surface cleansing with the brushes and in which debris is removed therefrom.

Brush 64 is shown as having a greater axial length of about twice that of brush 62. The brushes could have a common axial length and the diameters of each could be different than noted. The important thing is to have the brushes overlap to provide a common interfitting brush mass designed to contact as much as possible of the surface of the bird for scrubbing same.

The brushes 62, 64 are housed and operate in a shroud 70, only a portion of which is shown, it being understood that substantially complete enclosure of the brushes is preferred. Nozzle means 72 are positioned in the shroud to direct brush cleaning water sprays onto the brushes and particularly the brush tips as they rotate past overlap.

After the bird leaves the exit location of the washer, it will be subjected to a final water rinse. For that purpose and as seen in FIG. 2, nozzle means 74 are positioned to direct the final water rinse onto the bird. A detector is provided to insure that if a bird is not present on a shackle exiting the washer, no rinse medium flow can occur until a next shackle supported bird does leave the washer.

This can, e.g., be effected with use of a pivoted paddle 80 normally positioned in the travel path of an exiting bird, so that the travelling bird pivots the paddle to dashed line position which pivoting signals for or otherwise releases water flow to nozzle means 74. If a bird is not on an exiting shackle and since the paddle is positioned to be pivoted only by the exiting bird itself, no signal for or release of rinse water can take place. This arrangement contributes to an important purpose of the bird washer to use less water than prior washers.

Figures 6, 8:
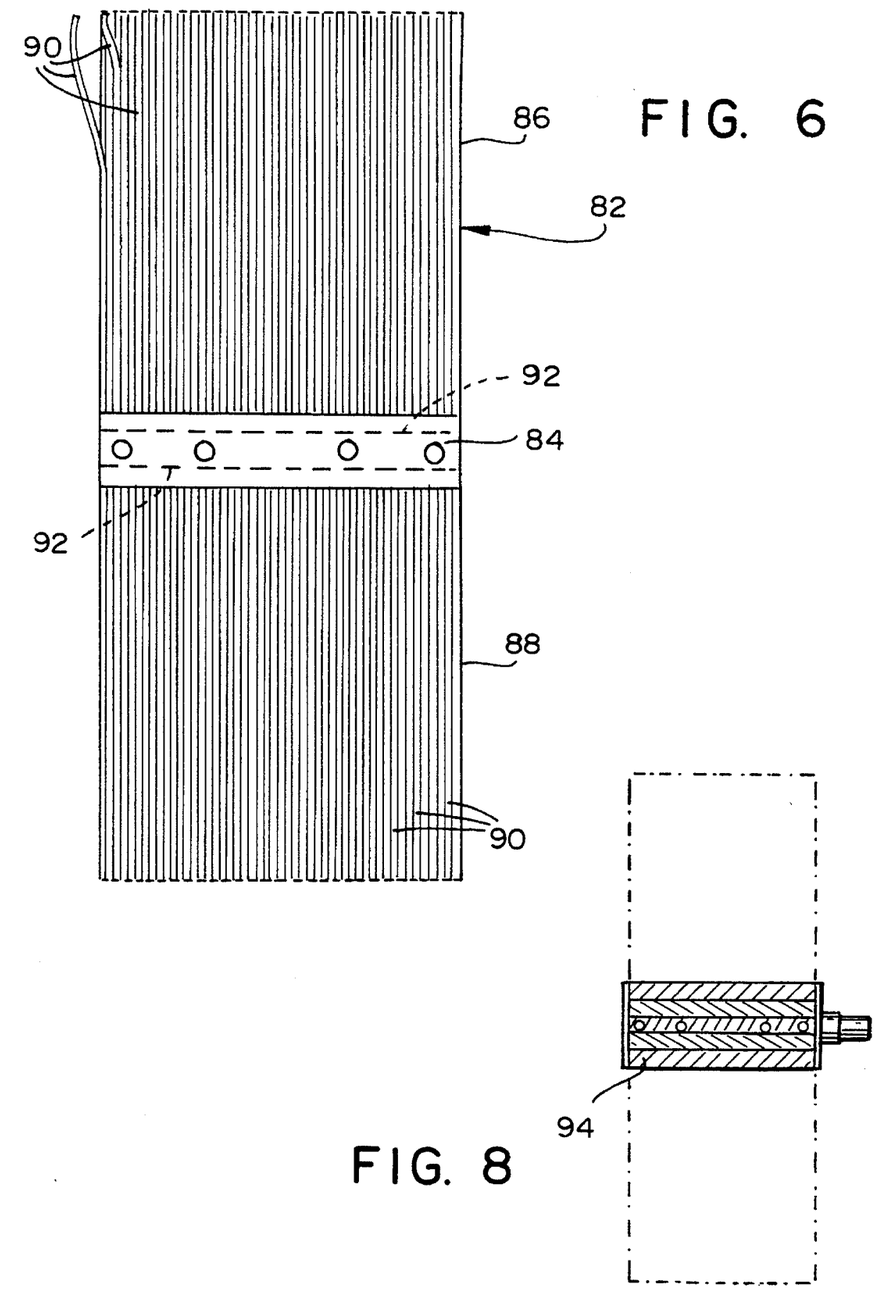
FIG. 6 is a plan view of a slit nylon sheet from which one of the plural brush packs of which the scrub brushes are constituted is fabricated.
FIG. 8 is a diagrammatic plan showing of the scrub brush core element.
Figure 7:
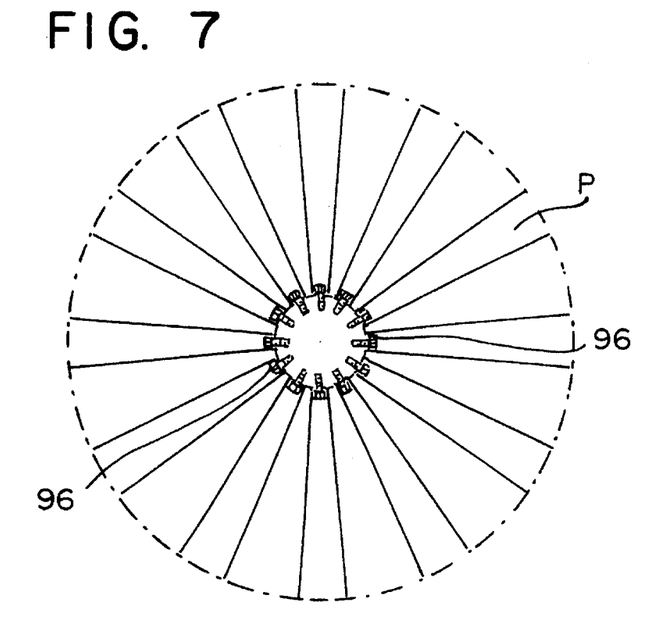
FIG. 7 is a side diagrammatic view depicting the brush pack assembly of the scrub brushes.

A feature of the invention is the construction and manner of fabricating the scrubbing brushes 62, 64. This is described now with continuing reference to FIGS. 6–8. A flat polymeric (such as a nylon) strip 82 of, e.g., 1 mm thickness is outlined to have a central part 84 and substantial strip lengths 86, 88 at the central part opposite sides. These lengths are longitudinally slit as at 90. The slit lengths are then bent toward each other along bend lines 92 to present a strip pack configuration P, such strip length relationship being evident from FIG. 7. The central strip part of the now configured brush pack is then fastened to a core or brush hub 94 as with fasteners 96 passing through openings in the central part. Brush 62 is made up in a representative embodiment of 12 brush packs P. Brush 64 on the other hand and being double the length of brush 62, can be made of 24 brush packs P.

The relatively stiff nature of the polymeric material causes the strips of the brush packs to maintain radial reach while at the same time being sufficiently flexing to conform closely with a bird carcass surface to scrub same. Polymeric material also gives good scrubbing action and is easily cleaned with a water spray.

Figure 9:
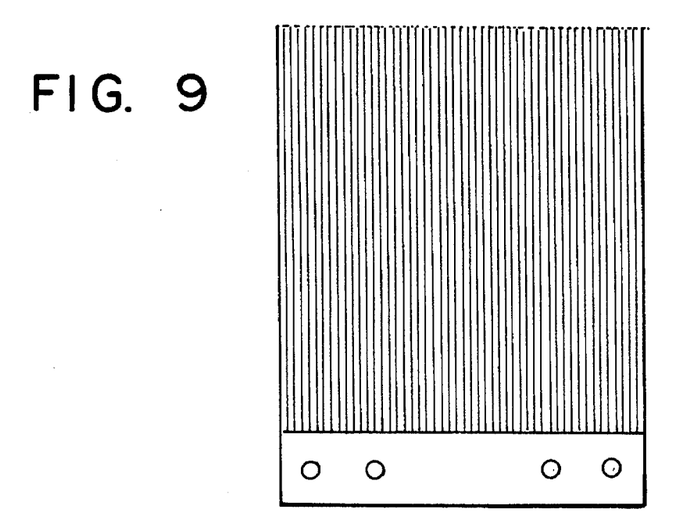
FIG. 9 shows a different embodiment of strip from which a brush pack can be made.

FIG. 9 shows that a brush pack can comprise a single sheet strip 93 that is not folded. The strip makes a pack that can be received in a slot of a hub.

The bird washer offers a number of advantages over prior washers. These include;

1. A bird presence on a shackle activates water supply to the water lances. Lack of bird on a shackle does not then allow a washing operation with loss of water.

2. The hollow cone spray patter of the water lances gives more forceful direct spray than prior systems and vertically moving the lance inside the carcass cavity gives better washing than prior washers using semistationary nozzles.

3. The scrubbing action of the brushes effects optimum exterior carcass surface cleaning and eliminates need for the prior water nozzle cleaning of the surface. It also saves downstream rework labor.

4. Washer water use is as low as 13–15 gallons/minute as compared to about 30 gallons/minute in other washers.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for washing poultry carcasses comprising
   means defining a frame;
   a rotary carousel unit supported on said frame for rotation about a fixed axis;
   a track passing through the apparatus on which a train of chicken carcasses supported on shackles can transit in tandem travel with the rotation of the carousel from an entry location to an exit location of the apparatus, the carcasses being suspended from the track such that a carcass open cavity faces upwardly; the rotary carousel including for each shackle in transit between the entry and exit locations, components which are fixed to rotate with the rotary carousel and include,
   an associated wash water actuator,
   an associated power operated vertical stroking means; a water lance connected to the vertical stroking means to move vertically therewith, the washing lance being such to receive a wash water flow and distribute it in a spray discharge; transit of the carcass carrying train and the rotary carousel being arranged such that at entry location the water lance associated with a given carcass carrying shackle is positioned above the cavity of the carcass carried by the shackle so that with operation of the stroking means to move the water lance downwardly the water lance enters the associated carcass cavity; the water actuator associated with the said shackle being actuatable to a held position by a presence of the carcass on the said shackle, so that in said held position water can be allowed to flow to the associated water lance from whence it can discharge into the carcass cavity to effect carcass interior washing; and
   means for controlling operation of the vertical stroking means to stroke it in downward and return upward movements.

2. The poultry washing apparatus of claim 1 in which the vertical stroking means controlling means is operable to cycle operation of a given such stroking means a plurality of upward and downward cycles thereof during a given shackle transit presence in the apparatus.

3. The poultry washing apparatus of claim 2 in which the said controlling means comprises a fixed cam, and a cam actuated control valve carried on the rotary carousel, the contro; valve being operable when actuated to allow power supply to the vertical stroking means for stroking it downwardly.

4. The poultry washing apparatus of claim 3 in which the vertical stroking means is a pressurized fluid operated cylinder unit in which presence therein of a higher pressurized flow at one cylinder piston face effects the downward stroking, there being constant presence of a fluid at a lower pressure value at an opposite cylinder piston face so that when a deactivation of said cam operated switch occurs the fluid higher pressurized presence will release at said one cylinder side whereby the lower pressure value fluid presence at the said other cylinder side will stroke the vertical stroking means upwardly.

5. The poultry washing apparatus of claim 3 in which the fixed cam has plural cam high points for actuating the control valve to provide corresponding complete vertical stroking means cycles during carcass transit in the apparatus, the control valve having a cam follower which when engaged with a cam low point deactivates the control valve.

6. The poultry washing apparatus of claim 3 further comprising a distribution manifold, said distribution manifold including manifold separate arrays of connection means for communication respective flows of high and lower pressure fluid to respective cylinder units, and wash water flows to respective water lances.

7. The poultry washing apparatus of claim 6 in which the said separate arrays of connection means are vertical spaced, there being vent channels in the manifold intervening the arrays and communicating with a manifold exterior surface to which a leakage flow of water and/or pressurized fluid from its associated connection means can vent.

8. The poultry washing apparatus of claim 1 further comprising carcass exterior scrubbing means disposed at the exit location to the apparatus operable to engage and scrub substantially the entire exterior surface of the carcass incident its exit from the apparatus.

9. The poultry washing apparatus of claim 8 in which the said scrubbing means comprises a pair of side by side scrubbing brushes rotatable about fixed parallel axes, the spacing between the axes being such that scrubbing masses of the two brushes at least in a mass part of each overlap and define a common scrub mass zone through which the carcass must pass.

10. The poultry washing apparatus of claim 9 in which the scrubbing brushes are comprised relatively stiff polymeric material strip packs.

11. The poultry washing apparatus of claim 10 in which the polymeric material is nylon.

12. The poultry washing apparatus of claim 9 in which one of the brushes is of larger diameter than the other.

13. The poultry washing apparatus of claim 9 in which one of the scrubbing brushes is of at least twice an axial expanse than the other.

14. The poultry washing apparatus of claim 9 in which the said scrubbing brushes are at least in part enclosed by a shroud.

15. The poultry washing apparatus of claim 9 further comprising rinse water direction means for directing a flow of rinse water on the scrubbing brushes.

16. The poultry washing apparatus of claim 1 further comprising rinse water projecting means located downstream of carcass exit from the apparatus for directing a final rinse water flow onto said carcass.

17. The poultry washing apparatus of claim 16 further comprising a detector located proximal the exit location of the apparatus and operable to detect passage or absence of passage of a carcass on its associated shackle from the apparatus so that such detection can be employed to allow or prevent supply of rinse water to said rinse water projecting means.

18. The poultry washing apparatus of claim 17 in which the detector comprises a pivoted paddle operable when pivoted to sense presence of a carcass.

19. The poultry washing apparatus of claim 1 in which the water lance is one which is such as to distribute the wash water flow in a hollow cone spray discharge.

* * * * *